Figure 1:
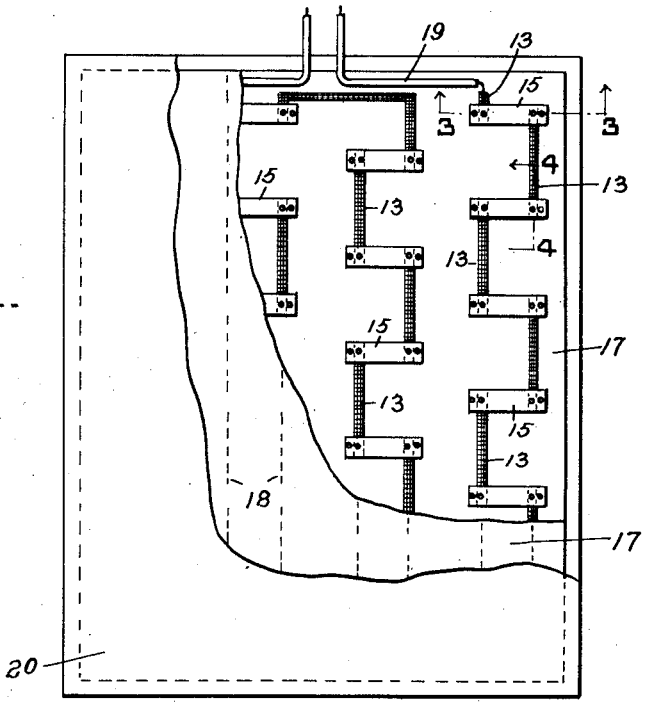

J. G. HOMAN.
ELECTRIC HEATING DEVICE.
APPLICATION FILED OCT. 2, 1915.

1,172,025.

Patented Feb. 15, 1916.

WITNESSES
J. M. Geoghegan.
C. M. Clark.

INVENTOR
John G. Homan,
By J. W. Cooke
Attorney.

UNITED STATES PATENT OFFICE.

JOHN G. HOMAN, OF STEUBENVILLE, OHIO, ASSIGNOR TO SCIENTIFIC PRODUCTS COMPANY, OF NEW CUMBERLAND, WEST VIRGINIA, A CORPORATION OF WEST VIRGINIA.

ELECTRIC HEATING DEVICE.

1,172,025.

Specification of Letters Patent. Patented Feb. 15, 1916.

Application filed October 2, 1915. Serial No. 53,714.

*To all whom it may concern:*

Be it known that I, JOHN G. HOMAN, a citizen of the United States, and a resident of Steubenville, in the county of Jefferson and State of Ohio, have invented a new and useful Improvement in Electric Heating Devices; and I do hereby declare the following to be a full, clear, and exact description thereof.

My invention pertains to electric heating devices, and relates particularly to electric heating pads of the kind which are employed in the place of hot water bottles and the like.

It is an object of my invention to improve generally upon devices of this nature.

It is another object of my invention to provide an electric heating pad in which the heat will be distributed properly over the surface of the pad, which will be flexible, and in which the liability to breakage or getting out of order will be reduced to a minimum.

It is another object of my invention to produce an electric heating pad constructed so as to permit any trouble which may occur, to be easily and quickly remedied.

Other and further objects of my invention will appear from the following specification taken in connection with the drawing annexed thereto.

I have shown, by way of example, in the accompanying drawing, and described in the following specification, an electric heating pad embodying my invention. It is to be understood, however, that the invention may be embodied in other forms, and that changes may be made in the particular form which I have shown and described, without exceeding the scope thereof, as defined in the appended claims.

Figure 2:
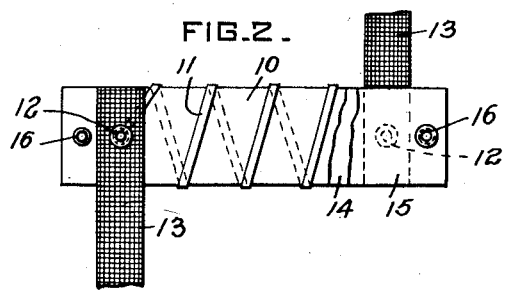
Figure 3:
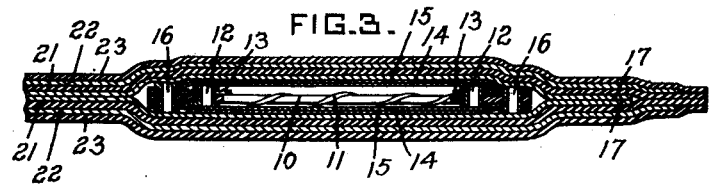
Figure 4:
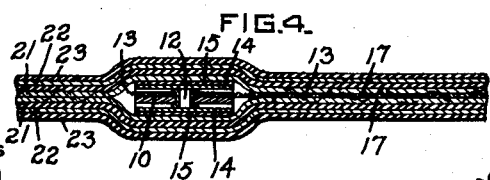

In the drawing: Figure 1 is a plan of an electric heating pad constructed in accordance with my invention, the support sheet and outer cover being partly broken away so as to disclose the arrangement of the heating elements; Fig. 2 is an enlarged plan of one of the heating elements, the mica strip and outer metallic strip being partly broken away; Fig. 3 is an enlarged section taken on the line 3—3 of Fig. 1, looking in the direction of the arrows; Fig. 4 is an enlarged section, taken on the line 4—4 of Fig. 1, looking in the direction of the arrows.

Like reference characters refer to like parts throughout the following specification, and the several figures of the accompanying drawing.

The heating pad comprises a plurality of heating elements suitably spaced and electrically connected in series with one another. Each of these elements includes a mica base 10, having wound thereon a resistance ribbon 11 adapted to become hot when current is passed therethrough. The ends of the resistance ribbon 11 are secured beneath the heads of metallic eyelets 12, one at each end of the base 10. Beneath each of the eyelets 12, is secured the end of a connecting strip 13 of wire cloth or the like, such strips being arranged so as to extend outwardly, in opposite directions, from the base 10. On each side of the base 10 is placed a mica strip 14 of corresponding shape to the base; and on the out-side of the strips 14 are placed thin metallic protecting strips 15. The strips 14 and 15 are secured in place on the base by means of end eyelets 16 which pass through the base and through such strips 14 and 15. In constructing the heating elements, each connecting strip 13 is made common to two elements, as shown in Fig. 1.

The heating elements are disposed, in their connected condition, and in staggered relation, between two sheets 17 of asbestos or the like, these sheets being secured together by means of lines of stitching 18, some of said lines preferably passing through the connecting strips 13, thereby securing the sheets 17 closely together with the heating elements fastened in their proper position between them. The connecting strips 13 of the two end elements have secured to them the ends of the lead wires 19, such lead wires emerging together from between the sheets 17, at the center of the pad.

The member made up of the sheets 17 having the heating elements between them, is placed between two covers 20, each of which consists of an inner layer 21 of asbestos or the like, and intermediate layer 22 in the form of a thin aluminum sheet, and an outer layer of asbestos or the like. The covers 20 are secured in position by stitching around the edges thereof. The complete pad, made up as described above, may be inclosed in a suitable bag.

The pad described above is extremely simple of manufacture, and may be readily repaired in case of one of the heating elements burning out, or other accident occurring. In the event of one of the heating elements being burnt out or becoming broken, for instance, it is only necessary to rip out the sewing and connect a wire between the two connecting strips of the spoilt element, whereupon the pad will perform its functions as before, only with one element missing. Or, if desired, a new element can very readily be inserted in place of the broken one. By reason of the arrangement and small size of the elements, the pad is extremely flexible and comfortable in use; and the metallic sheets 22 of the covers 20 cause the heat to be distributed evenly over the entire surface of the pad. The distribution of the heat is further aided by the provision of the relatively wide connecting strips 13, and the metallic outer plates 15 of the heating elements. In the practice, the individual heating elements are so thin as not to cause any appreciable increase of thickness of the pad at the places where the heating elements occur.

Having thus fully described my invention what I claim as new and desire to secure as Letters Patent:

1. An electric heating device comprising a support, a plurality of individual electrically-connected heating elements connected in spaced relation to said support, each of said elements having a metallic cover, and a metallic member associated with said elements for distributing the heat from the latter.

2. An electric heating device comprising a support, a plurality of individual heating elements connected in spaced relation to said support, each of said elements having a metallic cover, a plurality of widened metallic strips for connecting said elements electrically, and a metallic member associated with said elements for distributing the heat from the latter.

3. In an electric heating device a plurality of individual heating elements disposed in spaced relation, widened metallic strips for connecting said elements electrically, and a metallic member covering said elements and strips, for distributing the heat from said elements.

4. In an electric heating device, a plurality of individual heating elements disposed in spaced relation, each of said elements having a metallic cover, and a metallic member covering said elements and distributing the heat therefrom.

5. In an electric heating device, a plurality of individual heating elements disposed in spaced relation, each of said elements having a metallic cover, a plurality of widened metallic strips for connecting said elements electrically, and a metallic member covering said elements and strips for distributing the heat from said elements.

6. An electric heating device comprising a support, a plurality of individual heating elements mounted in spaced relation on said support, each of said elements having a metallic cover, and a plurality of widened metallic strips for connecting said elements electrically.

7. An electric heating device comprising a plurality of individual electrically connected heating elements disposed in spaced relation, each of said elements having a metallic cover, a pair of insulating sheets inclosing said elements between them, and a pair of metallic sheets inclosing said insulating sheets.

8. An electric heating device comprising a plurality of individual heating elements disposed in spaced relation, a plurality of widened metallic strips for connecting said elements electrically, a pair of insulating sheets inclosing said elements and strips between them, and a pair of metallic sheets inclosing said insulating sheets.

9. An electric heating device comprising a plurality of individual heating elements disposed in spaced relation, a plurality of wire cloth strips connecting said elements electrically, and a pair of insulating sheets inclosing said elements and strips between them and secured by sewing through said strips.

10. An electric heating device comprising a plurality of individual heating elements disposed in spaced relation, each of said elements including an insulating base having a resistance member mounted thereon and having wire cloth strips extending from each end of said resistance member, insulating strips inclosing said base, and metallic strips inclosing said base and insulating strips; insulating sheets inclosing said elements between them; and a cover on each side of said insulating sheets, said covers each consisting of a metallic sheet interposed between a pair of insulating sheets.

In testimony whereof I, the said JOHN G. HOMAN, have hereunto set my hand.

JOHN G. HOMAN.

Witnesses:
ADDA J. BUCHANAN,
ROY W. PERRYMAN.